United States Patent
Takeyama (10) Patent No.: US 9,509,370 B2
(45) Date of Patent: Nov. 29, 2016

(54) OPTICAL TRANSMISSION SYSTEM AND OPTICAL TRANSMISSION DEVICE

(71) Applicant: FUJITSU LIMITED, Kawasaki-shi, Kanagawa (JP)

(72) Inventor: Tomoaki Takeyama, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 37 days.

(21) Appl. No.: 14/482,225

(22) Filed: Sep. 10, 2014

(65) Prior Publication Data

US 2015/0125145 A1    May 7, 2015

(30) Foreign Application Priority Data

Nov. 5, 2013 (JP) ................. 2013-229567

(51) Int. Cl.
*H04B 3/46* (2015.01)
*H04B 10/077* (2013.01)

(52) U.S. Cl.
CPC ............ *H04B 3/46* (2013.01); *H04B 10/0775* (2013.01); *H04B 10/0779* (2013.01)

(58) Field of Classification Search
USPC ................................................ 398/173–181
See application file for complete search history.

(56) References Cited

U.S. PATENT DOCUMENTS

| | | | | |
|---|---|---|---|---|
| 5,812,710 A * | 9/1998 | Sugaya | H01S 3/1301 | 359/337 |
| 5,818,629 A * | 10/1998 | Kinoshita | G01J 9/00 | 359/337 |
| 5,943,146 A * | 8/1999 | Harano | H04B 10/0777 | 370/243 |
| 5,963,361 A * | 10/1999 | Taylor | H01S 3/06758 | 359/337 |
| 6,025,947 A * | 2/2000 | Sugaya | H01S 3/06758 | 359/337 |
| 6,057,959 A * | 5/2000 | Taylor | H04B 10/2941 | 359/337.13 |
| 6,215,584 B1 * | 4/2001 | Yang | H01S 3/06758 | 359/337.4 |
| 6,236,487 B1 * | 5/2001 | Stephens | H04B 10/2935 | 398/147 |
| 6,359,726 B1 * | 3/2002 | Onaka | H04B 10/296 | 359/337.1 |
| 6,373,625 B1 * | 4/2002 | Kobayashi | H04B 10/296 | 359/337.12 |
| 6,377,396 B1 * | 4/2002 | Sun | H01S 3/06754 | 359/341.42 |
| 6,381,064 B1 * | 4/2002 | Terahara | H01S 3/10023 | 359/337.13 |
| 6,441,955 B1 * | 8/2002 | Takatsu | G06F 12/0866 | 359/337.12 |
| 6,532,103 B1 * | 3/2003 | Sakano | H04J 14/0221 | 359/337.11 |
| 6,542,291 B1 * | 4/2003 | Kinoshita | H01S 3/094003 | 359/337.12 |
| 6,690,506 B2 * | 2/2004 | Zahnley | H04B 10/077 | 359/337.11 |
| 6,775,056 B2 * | 8/2004 | Grubb | H04B 10/2916 | 359/334 |
| 6,819,875 B2 * | 11/2004 | Touma | H04B 10/506 | 359/337 |
| 6,839,522 B2 * | 1/2005 | Grubb | H04B 10/2935 | 398/158 |
| 6,873,457 B2 * | 3/2005 | Kinoshita | H01S 3/094003 | 359/337.12 |
| 6,903,324 B2 * | 6/2005 | Tomofuji | H04B 10/2942 | 250/214 LA |

(Continued)

FOREIGN PATENT DOCUMENTS

| | | |
|---|---|---|
| JP | 2005-204026 | 7/2005 |
| JP | 2005-269194 | 9/2005 |

(Continued)

*Primary Examiner* — Agustin Bello
(74) *Attorney, Agent, or Firm* — Staas & Halsey LLP (57) ABSTRACT

An optical transmission system includes: a first optical transmission device configured to perform bidirectional optical transmission with a second optical transmission device via an optical transmission line, wherein the first optical transmission device includes a transmitted light power adjusting section configured to transmit, to the second optical transmission device, a first light power which is set based on a measurement result, the second transmission device measuring a fluctuating light power transmitted from the first transmission device and informing the first transmission device of the measurement result.

20 Claims, 7 Drawing Sheets

(56) References Cited

U.S. PATENT DOCUMENTS

| | | | | |
|---|---|---|---|---|
| 6,920,287 | B1* | 7/2005 | Hinds | H04B 10/0771 370/241 |
| 6,928,243 | B2* | 8/2005 | Youn | H04B 10/077 398/33 |
| 6,943,937 | B2* | 9/2005 | Lelic | H04B 10/077 359/337.11 |
| 7,046,430 | B2* | 5/2006 | Grubb | H04B 10/2916 359/337.4 |
| 7,068,422 | B2* | 6/2006 | Lee | H04B 10/2942 359/337.4 |
| 7,227,681 | B2* | 6/2007 | Sugaya | H01S 3/06758 359/337.1 |
| 7,242,863 | B2* | 7/2007 | DeGrange, Jr. | H04B 10/0775 398/30 |
| 7,321,727 | B2* | 1/2008 | Ng | H04B 10/075 398/21 |
| 7,345,811 | B2* | 3/2008 | Fisher | H04B 10/0797 359/337.2 |
| 7,756,422 | B2* | 7/2010 | Sakamoto | H04B 10/07 398/177 |
| 7,791,792 | B2* | 9/2010 | Lundquist | H04B 10/296 359/341.3 |
| 7,911,684 | B1* | 3/2011 | Chen | H04B 10/2941 359/337.1 |
| 8,547,629 | B2* | 10/2013 | Inagaki | H01S 3/06758 359/337 |
| 8,553,319 | B2* | 10/2013 | Sugaya | H01S 3/06758 359/333 |
| 8,699,126 | B2* | 4/2014 | Sugaya | H01S 3/06758 359/337.11 |
| 8,908,265 | B2* | 12/2014 | Rapp | H04B 10/2941 359/337.1 |
| 8,917,445 | B2* | 12/2014 | Nakata | H04B 10/293 359/341.42 |
| 9,007,680 | B2* | 4/2015 | Sugaya | H01S 3/06758 359/337.4 |
| 2002/0024690 | A1* | 2/2002 | Iwaki | H04B 10/03 398/13 |
| 2003/0035171 | A1 | 2/2003 | Touma | |
| 2004/0047628 | A1* | 3/2004 | Passier | H04B 10/077 398/15 |
| 2005/0158057 | A1 | 7/2005 | Tomofuji et al. | |
| 2015/0125145 | A1* | 5/2015 | Takeyama | H04B 10/564 398/34 |

FOREIGN PATENT DOCUMENTS

| | | |
|---|---|---|
| JP | 2008-245118 | 10/2008 |
| JP | 2012-205172 | 10/2012 |
| WO | WO 01/80466 A1 | 10/2001 |

\* cited by examiner

OPTICAL TRANSMISSION SYSTEM AND OPTICAL TRANSMISSION DEVICE

CROSS-REFERENCE TO RELATED APPLICATION

This application is based upon and claims the benefit of priority of the prior Japanese Patent Application No. 2013-229567, filed on Nov. 5, 2013, the entire contents of which are incorporated herein by reference.

FIELD

The embodiment discussed herein is related to optical transmission systems and optical transmission devices.

BACKGROUND

In an optical transmission system, an optical signal is transmitted.

Japanese Laid-open Patent Publication No. 2005-204026, Japanese Laid-open Patent Publication No. 2012-205172, International Publication Pamphlet No. WO 2001/080466, Japanese Laid-open Patent Publication No. 2008-245118, or Japanese Laid-open Patent Publication No. 2005-269194 is an example of related art.

SUMMARY

According to an aspect of the embodiments, an optical transmission system includes: a first optical transmission device configured to perform bidirectional optical transmission with a second optical transmission device via an optical transmission line, wherein the first optical transmission device includes a transmitted light power adjusting section configured to transmit, to the second optical transmission device, a first light power which is set based on a measurement result, the second transmission device measuring a fluctuating light power transmitted from the first transmission device and informing the first transmission device of the measurement result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, an optical transmission system includes an (upstream station-side) optical transmission device and a (downstream station-side) optical transmission device which are disposed in such a way as to face each other via a bidirectional optical transmission line. An OSC signal which is a monitoring control signal is transmitted from the upstream station-side optical transmission device to the downstream station-side optical transmission device by using an ASE light of a transmission postamplifier. In the downstream station-side optical transmission device, mode settings of a reception preamplifier and a variable optical attenuator provided in a previous stage of the reception preamplifier are performed in accordance with the received OSC signal. Therefore, since automatic adjustments are performed such that input power to the reception preamplifier has an appropriate level, the reception preamplifier is automatically started in an appropriate mode of operation.

For instance, in an optical transmission system in which the span loss of the optical transmission system is automatically adjusted, reception power level information is detected from an optical signal which is received from a transmission device through an optical transmission line. Transmission power level information of the optical signal is received from the transmission device through the optical transmission line as a monitoring signal. The span loss of the optical transmission line is detected based on a difference between the transmission power level information and the reception power level information of the optical signal. Variable control of the attenuation of an input of a light receiving unit is performed based on a difference between the detected span loss value and a span loss target value which is set in advance. As a result, in one of the transmission devices coupled to each other by the optical transmission line, the span loss is efficiently adjusted.

For example, in a wavelength multiplexing transmission system, the transmission output level and the reception input level of each of a main signal light and an OSC light are monitored and the loss is calculated based on each monitored level, whereby the output level of the main signal light is corrected. As a result, even when the main signal light is not communicated, adjustment of the transmitted light level is made by using the OSC light.

For instance, in a light receiving device having a variable optical attenuator (VOA) and a photodetector, the dynamic range of an optical input level (monitor) is expanded by a VOA provided in an input stage.

In the optical transmission system, a variable optical attenuator may be provided in a subsequent stage of a transmission-side optical amplifier (postamplifier). As a result of the attenuation amount of the transmission-side variable optical attenuator being adjusted, fluctuations in the input level on the reception side which are caused by a transmission line loss having variations depending on the transmission distance may be absorbed.

A variable optical attenuator provided on the reception side (downstream station side) may be controlled. For example, when the variable optical attenuator provided on the transmission side is not controlled, the received light power on the reception side is out of a certain reception range due to the transmission line loss, which may result in the failure of system start-up.

An embodiment which will be described below is an example. In the drawings described below, portions identified with the same reference characters may indicate the same or similar portions.

Figure 1:
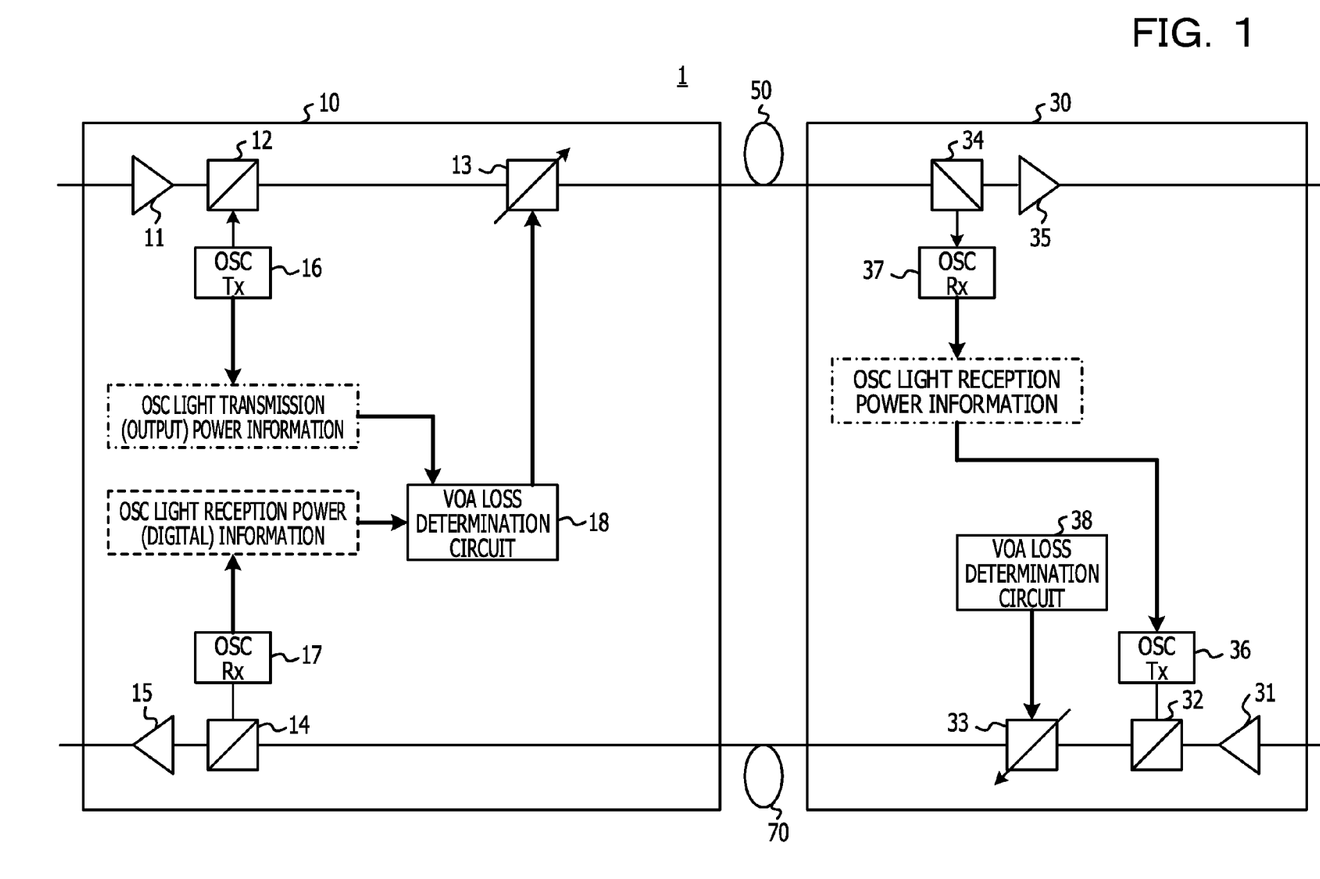
FIG. 1 illustrates an example of an optical transmission system.

FIG. 1 illustrates an example of an optical transmission system. An optical transmission system 1 illustrated in FIG. 1 includes a first optical transmission device 10, a second optical transmission device 30, and optical transmission lines 50 and 70 which couple the optical transmission devices 10 and 30 in such a way that the optical transmission devices 10 and 30 are capable of performing communication with each other.

The optical transmission lines 50 and 70 may be, for example, transmission lines using an optical fiber. The optical transmission line 50 transmits an optical signal from the optical transmission device 10 to the optical transmission device 30. On the other hand, the optical transmission line 70 transmits an optical signal from the optical transmission device 30 to the optical transmission device 10.

For instance, the optical transmission devices 10 and 30 may perform bidirectional optical communication with each other through the optical transmission lines 50 and 70. The optical signal which is transmitted between the optical transmission devices 10 and 30 may be a wavelength multiplexing optical signal (a WDM signal) obtained by multiplexing lights of multiple wavelengths or an optical signal of one wavelength.

A direction or route of transmission from the optical transmission device 10 to the optical transmission device 30 may be referred to as a "forward direction" or a "forward route" for the sake of convenience. An opposite direction or route of transmission from the optical transmission device 30 to the optical transmission device 10 may be referred to as an "opposite direction" or an "opposite route" for the sake of convenience. Therefore, on the forward route, the optical transmission device 10 may correspond to a transmission station that transmits an optical signal to the optical transmission device 30 and the optical transmission device 30 may correspond to a reception station that receives an optical signal from the optical transmission device 10. On the opposite route, the relationship between the transmission station and the reception station may be reversed.

On the optical transmission line 50 (the forward route) in the optical transmission device 10, for example, an optical amplifier (a postamplifier) 11, an optical multiplexer (a coupler) 12, and a variable optical attenuator (VOA) 13 are provided.

The postamplifier 11 is disposed in a subsequent stage of an optical transmitter (which is not depicted in the drawing) that transmits a main signal light, and amplifies the main signal light transmitted by the optical transmitter and outputs the amplified main signal light to the optical multiplexer 12.

The optical multiplexer 12 superimposes an optical supervisory channel (OSC) light which is input from an OSC transmitter 16 on the main signal light amplified by the postamplifier 11 and outputs the resultant light to the VOA 13. The OSC light may be a monitoring control light that is used to transmit setting information and control information to the optical transmission device 30 which is an opposite station or to measure the loss (the transmission line loss) of the optical transmission line 50 (70).

The VOA 13 adjusts the transmission power of the main signal light on which the OSC light is superimposed to the optical transmission line 50. In this adjustment, the attenuation amount of the VOA 13 is controlled by a VOA loss determination circuit 18, for example.

The OSC transmitter 16 has a light source such as a laser diode (LD), generates an OSC light by using an output light of the light source and outputs the OSC light to the optical multiplexer 12.

On the optical transmission line 70 (the opposite route) in the optical transmission device 10, an optical branching filter (a coupler) 14 and an optical amplifier (a preamplifier) 15, for example, are provided.

The optical branching filter 14 separates the optical signal received through the optical transmission line 70 into a main signal light and an OSC light. The main signal light is output to the preamplifier 15, and the OSC light is output to an OSC receiver 17. The OSC light may be the OSC light that is superimposed on the main signal light to be transmitted to the optical transmission line 70 (the opposite route) in the opposite station 30.

The OSC receiver 17 has a light receiving element such as a photodiode (PD), and converts the light received by the light receiving element into an electrical signal in accordance with the received light power. The electrical signal is converted into digital information by an AD converter or the like. Therefore, the reception power information of the OSC light may be obtained by the digital information.

The reception power information of the OSC light transmitted from the transmission station 10 and received by the opposite station 30 through the optical transmission line 50 is transmitted (fed back) to the transmission station 10, whereby the transmission line loss of the optical transmission line 50 of the forward route may be obtained in the transmission station 10.

For example, the VOA loss determination circuit 18 of the transmission station 10 obtains the transmission line loss of the optical transmission line 50 (the forward route) based on the transmission (output) power information of the OSC light of the OSC transmitter 16 and the reception power information of the OSC light in the opposite station 30, the OSC light received by the OSC receiver 17. The VOA loss determination circuit 18 determines the attenuation amount (the VOA loss) of the VOA 13 in accordance with the obtained transmission line loss and controls the VOA 13 such that the determined attenuation amount is obtained.

The preamplifier 15 is disposed in a previous stage of a light receiver that receives a main signal light, for example, and amplifies the main signal light which is input from the optical branching filter 14. The preamplifier 15 amplifies the optical signal attenuated as a result of being transmitted over the optical transmission line 70 of the opposite route to a receptible level for the light receiver.

The optical transmission device 30 which is an opposite station may have a configuration that is substantially the same or similar to the configuration of the optical transmission device 10. For example, on the optical transmission line 70 of the opposite route, an optical amplifier (a postamplifier) 31, an optical multiplexer (a coupler) 32, and a variable optical attenuator (VOA) 33, for example, may be provided.

The postamplifier 31 is disposed in a subsequent stage of an optical transmitter that transmits a main signal light, and amplifies the main signal light transmitted by the optical transmitter and outputs the amplified main signal light to the optical multiplexer 32.

The optical multiplexer 32 superimposes the OSC light which is input from the OSC transmitter 36 on the main signal light amplified by the postamplifier 31 and outputs the resultant light to the VOA 33.

The VOA 33 adjusts the transmitted light power of the main signal light on which the OSC light is superimposed to the optical transmission line 70. This adjustment may be carried out by controlling the attenuation amount of the VOA 33 by a VOA loss determination circuit 38, for example.

On the optical transmission line 50 (the forward route) in the optical transmission device 30, an optical branching filter (a coupler) 34 and an optical amplifier (a preamplifier) 35, for example, may be provided.

The optical branching filter 34 separates the optical signal received through the optical transmission line 50 into a main signal light and an OSC light. The main signal light is output to the preamplifier 35, and the OSC light is output to the OSC receiver 37. The OSC light may be the OSC light that is superimposed on the main signal light to be transmitted to the optical transmission line 50 (the forward route) in the opposite station 10.

The preamplifier 35 may be disposed in a previous stage of a light receiver that receives a main signal light, for example. The main signal light which is input from the optical branching filter 34 is amplified. The preamplifier 35 amplifies the optical signal attenuated as a result of being transmitted over the optical transmission line 50 of the forward route to a receptible level for the light receiver.

The OSC receiver 37 has a light receiving element such as a photodiode (PD), for instance, and converts the light received by the light receiving element into an electrical signal in accordance with the received light power. The electrical signal is converted into digital information by an AD converter or the like. The reception power information of the OSC light may be obtained by the digital information.

When the transmission line loss of the optical transmission line 50 of the forward route is measured, the reception power information of the OSC light in the OSC receiver 37 is provided to the OSC transmitter 36 on the opposite route side. The OSC transmitter 36 superimposes the OSC light reception power information of the forward route on the main signal light that is transmitted to the optical transmission line 70 by outputting the OSC light reception power information provided thereto to the optical multiplexer 32.

The attenuation amount of the VOA 33 on the opposite route may be controlled by the VOA loss determination circuit 38 in substantially the same manner as the attenuation amount of the VOA 13 on the forward route. For example, the VOA loss determination circuit 38 obtains the transmission line loss of the optical transmission line 70 (the opposite route) based on the transmission (output) power information of the OSC light of the OSC transmitter 36 of the local station 30 and the reception power information of the OSC light in the opposite station 10 which is received by the OSC receiver 37. The VOA loss determination circuit 38 determines the attenuation amount (the VOA loss) of the VOA 33 in accordance with the obtained transmission line loss and controls the VOA 33 such that the determined attenuation amount is obtained.

In the optical transmission system 1, the start-up and operation of the system are performed by using the two routes: the forward route and the opposite route.

Next, in the transmission station 10 (or 30), the VOA 13 (or 33) may be disposed in a subsequent stage of the postamplifier 11 (or 31).

The transmission line loss is also called a system gain (SG) and may vary depending on the transmission distance. The transmission distance tends to be increased, and, for example, a range of 0 to 30 dB may be desired as the SG. As a result, the input level of the preamplifier 15 (35) of the reception station 30 (or 10) may also vary in the range of 30 dB.

For such a broad range of SGs, in the optical transmission system 1, the output of the preamplifier 15 (or 35) may be fixed and flat with respect to a wavelength. It may be difficult to provide the flatness with respect to a wavelength and a good noise factor (NF) for a broad range of input levels.

Therefore, the VOA 13 (or 33) is disposed in a subsequent stage of the postamplifier 11 (or 31) of the transmission station 10 (or 30), whereby variations in the SG may be absorbed by the VOA 13 (or 33).

For example, in the reception station 30 (or 10), the VOA is disposed in a previous stage of the preamplifier 35 (or 15), and feedback control of the attenuation of the VOA is performed in accordance with the input level of the preamplifier 35 (or 15).

If the SG is low, it may be more preferable to dispose the VOA 13 (or 33) in a subsequent stage of the postamplifier 11 (or 31) as illustrated in FIG. 1 as compared to a case where the VOA is disposed in a previous stage of the preamplifier 35 (or 15). For example, by increasing the attenuation amount of the VOA 13 (or 33) and reducing the input optical power to the optical transmission line 50 (or 70), a nonlinear effect which is produced in the optical transmission line 50 (or 70) may be suppressed.

Figure 2:
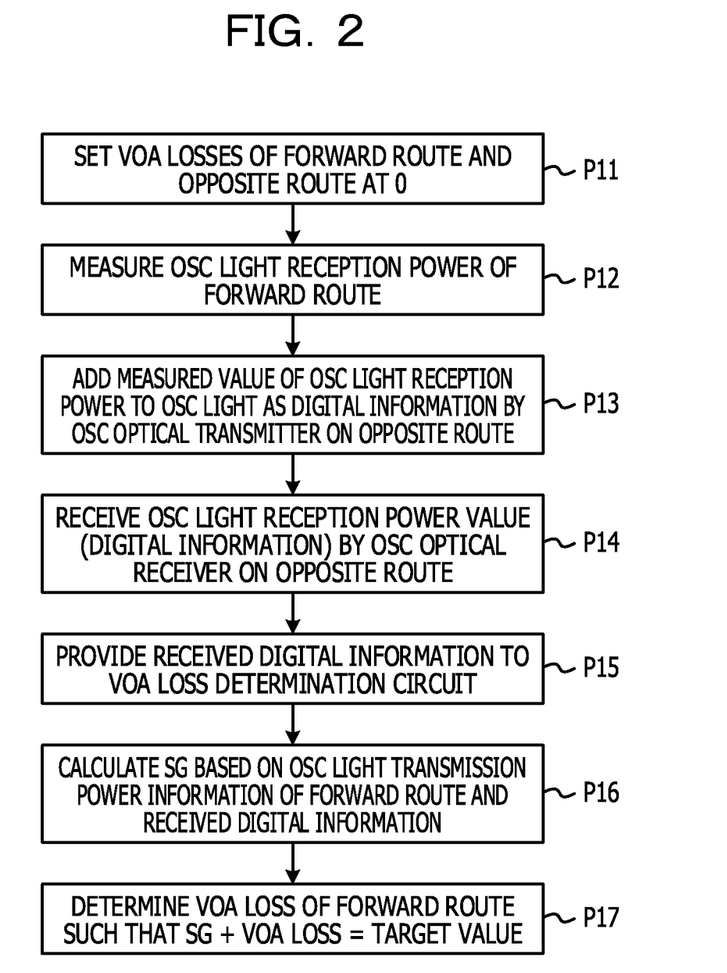
FIG. 2 illustrates an example of start-up operation of an optical transmission system.

FIG. 2 illustrates an example of start-up operation of an optical transmission system. In FIG. 2, start-up of the optical transmission system illustrated in FIG. 1 is described. At the time of start-up of the optical transmission device 10 (or 30), to set the attenuation amount (the VOA loss) of the VOA 13 (or 33), the loss of the optical transmission line 50 (or 70) may be measured by using the OSC light. At the time of start-up, the VOA losses of the VOAs 13 and 33 may be set at 0 dB, for example, as initial values (P11).

The transmission station 10 (or 30) makes the LD of the OSC transmitter 16 (or 36) emit light and transmits the OSC light to the reception station 30 (or 10). The reception station 30 (or 10) measures the OSC light reception power with the PD of the OSC receiver 37 (or 17) (P12).

The obtained measured value of the OSC light reception power is added, as digital information, to the OSC light to be superimposed on the output light (the main signal light) of the postamplifier 31 (or 11) on the opposite route (P13). The OSC light is transmitted (fed back) to the transmission station 10 (or 30) through the optical transmission line 70 (or 50) of the opposite route.

The digital information of the fed back OSC light reception power is received by the PD of the OSC receiver 17 (or 37) in the transmission station 10 (or 30) (P14), and is provided to the VOA loss determination circuit 18 (or 38) as digital information (P15).

The VOA loss determination circuit 18 (or 38) obtains the SG of the optical transmission line 50 (or 70) based on the OSC light transmission power information of the local station 10 (or 30) and the OSC light reception power information fed back from the opposite station 30 (or 10) (P16). The VOA loss determination circuit 18 controls the VOA 13 (or 33) based on the obtained SG such that the attenuation amount that absorbs the variations in the SG is obtained. For example, settings may be performed such that the sum of the VOA loss and the SG becomes a target value, for example, 20 dB or the like (P17).

The transmission line losses (SGs) of the forward route and the opposite route are measured by using the OSC light, and the attenuation amount of the VOAs 13 and 33 on the forward route and the opposite route are controlled based on the measured values. Therefore, the transmitted light power to the forward route and the opposite route at the time of start-up of the system may be set at an appropriate value in accordance with the SGs.

For example, when the SG is in the range of 20 to 30 dB, even when the VOA loss is set at 0 dB, the sum of the VOA loss and the SG may become greater than 20 dB which is a target value. The preamplifier 15 (or 35) may provide good output flatness and NF for an input range of about 10 dB.

The transmission power of the OSC transmitter 16 (or 36) is at substantially the same level as the output power of the postamplifier 11 (or 31) and may be 0 dBm, for example. The reception range of the OSC receiver 17 (or 37) may be −10 to −30 dBm, for example. The upper limit of the reception range may be referred to as an overload. If the power exceeds the upper limit, since an amplifier of an electrical circuit attached to the PD of the OSC receiver 17 (or 37) becomes saturated, a digital signal waveform becomes distorted, which may cause degradation in a bit error rate (BER). The lower limit of the reception range may be referred to as minimum receiving sensitivity. If the power falls below the lower limit, the BER may be degraded by the effect of the dark current of the PD or the noise in an electrical circuit attached to the PD.

Figure 3:
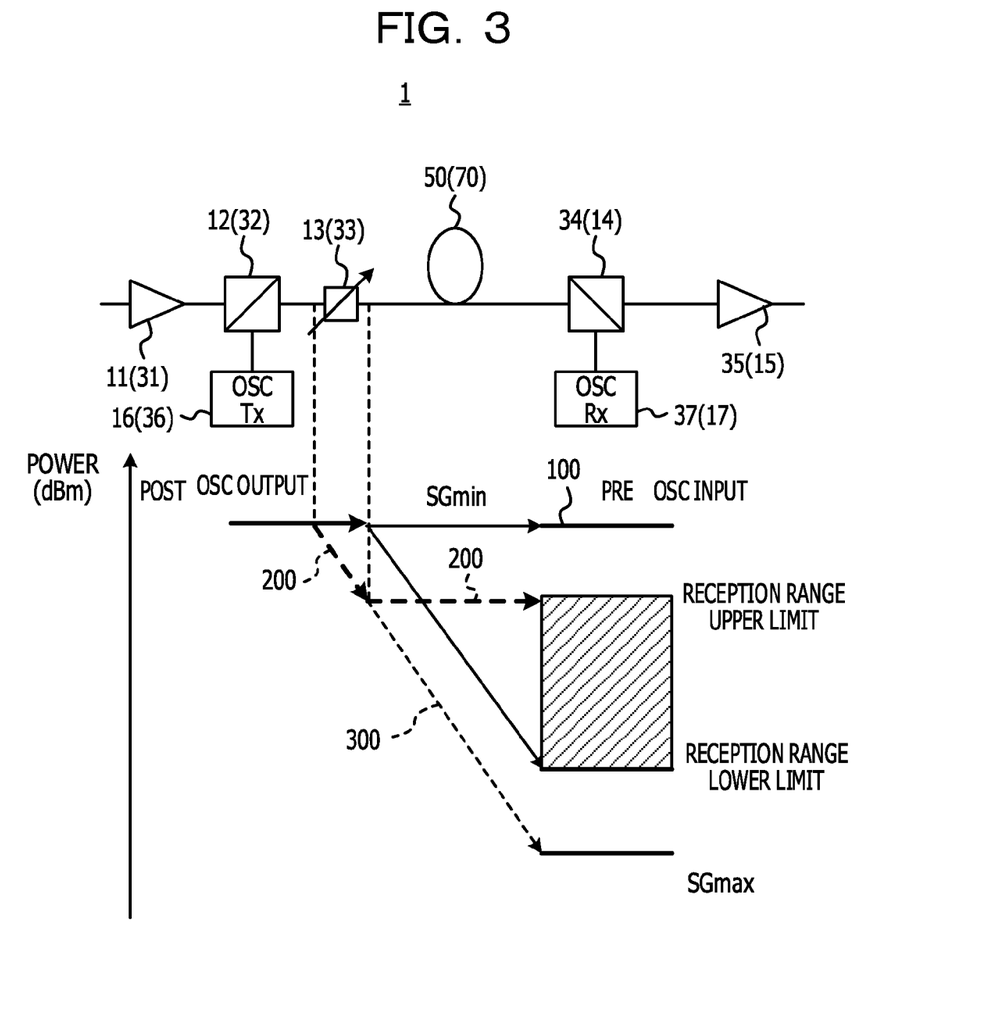
FIG. 3 illustrates an example of a level diagram of OSC light power.

FIG. 3 illustrates an example of a level diagram of OSC light power. In FIG. 3, a level diagram of the OSC light power of the optical transmission system 1 is illustrated. In the case where the initial value of the VOA loss is set at 0 dB and the system is started, the OSC light reception power may exceed the upper limit of the reception range when the minimum value of the SG (SGmin) is 0 dB (see reference numeral 100).

Even when the digital information of the OSC light reception power in the OSC receiver 37 (or 17) on the forward route is transmitted from the OSC transmitter 36 (or 16) on the opposite route, the digital information may not reach the OSC receiver 17 (or 37) on the opposite route and the system may not be started.

For example, if the initial value of the VOA loss is set at 10 dB, even when the SG is 0 dB, since the OSC light reception power becomes lower than or equal to the upper limit of the reception range (see a dotted arrow 200), the start-up of the system may be performed. For example, if the SG is 30 dB, since the received light power of the OSC receiver 17 (or 37) on the opposite route falls below the lower limit of the reception range (see a dotted arrow 300), the digital information may not be received properly and the system may not be started.

Even when the attenuation amount of the VOA 13 (or 33) of the transmission station is changed randomly in such a way that the OSC light reception power falls within a certain reception range, the OSC light on the opposite route is used by the reception station to inform the transmission station that the OSC light reception power has fallen within the reception range. At this time, on the opposite route, the received light power of the OSC receiver 17 (or 37) may not fall within the reception range.

For example, the information indicating whether or not the OSC light reception power is within the reception range may not reach the VOA 13 (or 33) in real time, and the time that elapses before the VOA loss at which communication of the OSC light is established is set may not be estimated. For example, since it takes forever to establish communication of the OSC light, the start-up may not be completed.

For instance, when the VOA is disposed in a previous stage of the preamplifier of the reception station, a problem at the time of start-up of the system may not arise. The reason is as follows: the VOA loss is set such that the received light power of the OSC receiver falls within the reception range in the reception station even though communication with the opposite station (the transmission station) is not performed by using the OSC light on the opposite route.

For example, a technique of starting the system 1 under any conditions without depending on the transmission line loss (SG) in the optical transmission system 1 illustrated in FIG. 1 in which bidirectional optical communication is possible may be offered.

Figure 4:
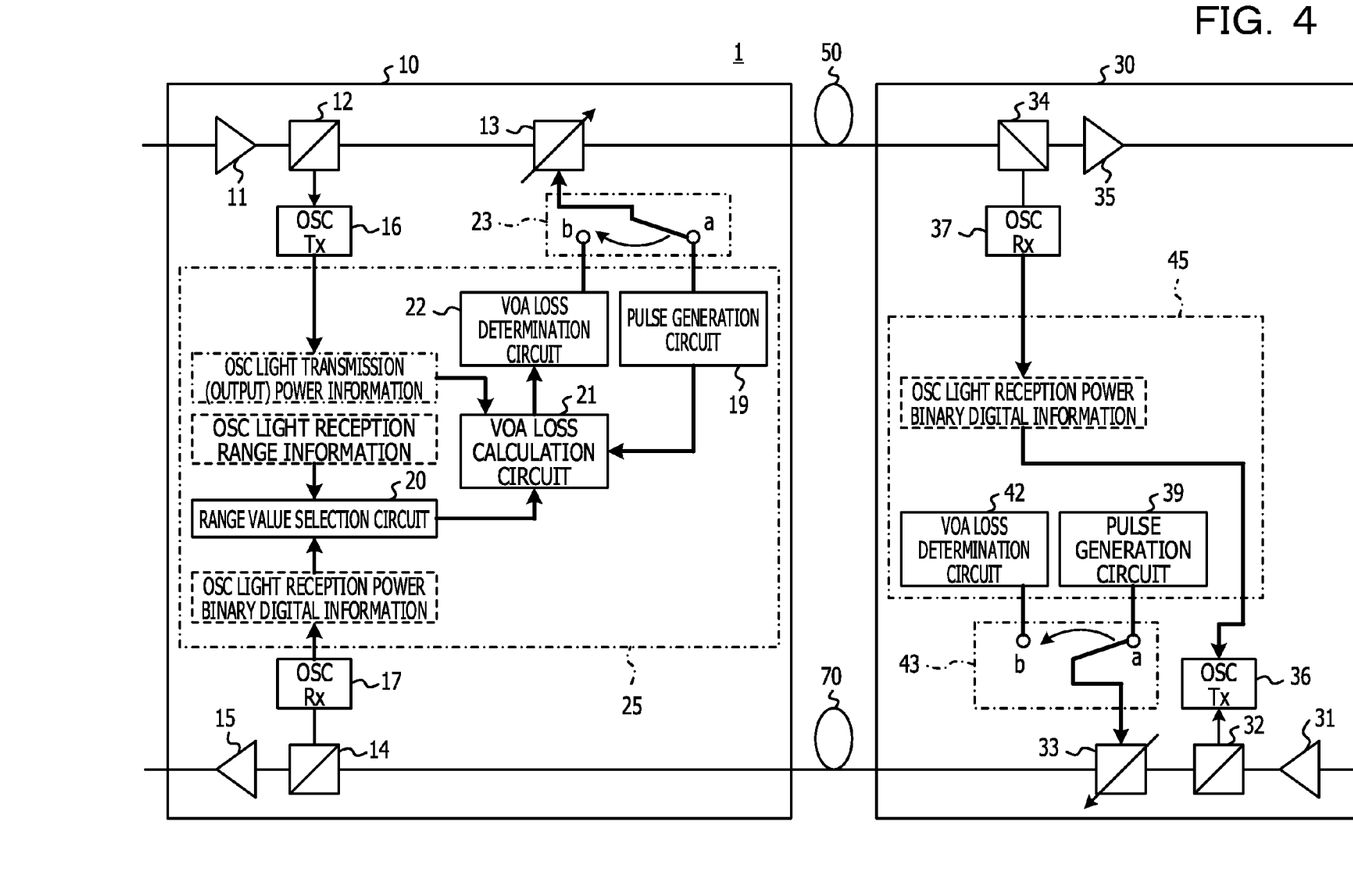
FIG. 4 illustrates an example of an optical transmission system.
Figure 5:
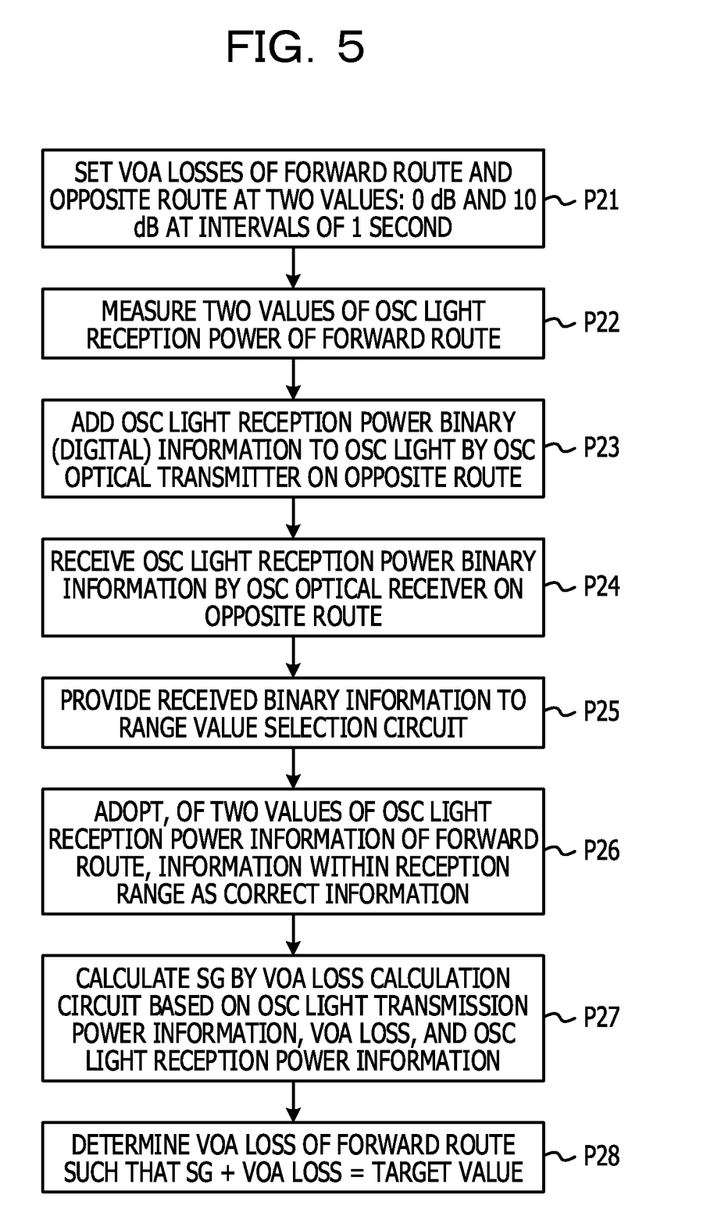
FIG. 5 illustrates an example of start-up operation of an optical transmission system.

FIG. 4 illustrates an example of an optical transmission system. FIG. 5 illustrates an example of start-up operation of a optical transmission system. In FIG. 5, start-up of the optical transmission system illustrated in FIG. 4 is described. An optical transmission system 1 illustrated in FIG. 4 includes a pulse generation circuit 19, a range value selection circuit 20, a VOA loss calculation circuit 21, a VOA loss determination circuit 22, and a switch 23 in an optical transmission device 10 which is a transmission station on a forward route, for example. An optical transmission device 30 which is a reception station on a forward route illustrated in FIG. 4 includes a pulse generation circuit 39 and a VOA loss determination circuit 42, for example.

On the opposite route, the optical transmission device 30 may be a transmission station and the optical transmission device 30 may be a reception station. The optical transmission device 30 corresponding to the transmission station on the opposite route illustrated in FIG. 4 may include circuits corresponding to the range value selection circuit 20, the VOA loss calculation circuit 21, and the VOA loss determination circuit 22 on the opposite route.

In the transmission station 10 on the forward route (or the transmission station 30 on the opposite route), the pulse generation circuit 19 (or 39) generates a VOA control signal (pulse) that changes the attenuation amount of the VOA 13 (or 33) to two or more different values at the start of start-up of the device (system). The VOA control signal may be a periodic pulse that changes (switches) the VOA loss in the following manner: 0 dB→10 dB→0 dB every 1 second, for example (P21 of FIG. 5).

The switch 23 (or 43) selects any one of the output of the pulse generation circuit 19 (or 39) and the output of the VOA loss determination circuit 22 (or 42) and outputs the selected output to the VOA 13 (or 33). At the start of start-up of the device (system), the switch 23 (or 43) is switched to a contact a, and the output of the pulse generation circuit 19 (or 39) is provided to the VOA 13 (or 33). As a result, the VOA 13 (or 33) changes the VOA loss in accordance with the VOA control pulse.

When the VOA loss is determined by the VOA loss determination circuit 22 (or 42), the switch 23 (or 43) is switched to a contact b, and the output of the VOA loss determination circuit 22 (or 42) is provided to the VOA 13 (or 33). Before the VOA loss is determined by the VOA loss determination circuit 22 (or 42), the switch 23 (or 43) is switched to the contact a, and, after the VOA loss is determined by the VOA loss determination circuit 22 (or 42), the switch 23 (or 43) is switched to the contact b. Therefore, before the VOA loss is determined, the VOA loss is periodically switched to different values, for example, and, after the VOA loss is determined, the VOA 13 (or 33) is fixedly set at the determined VOA loss.

Since the VOA loss is switched to different values before the VOA loss is determined, the input optical power to the optical transmission line 50 (or 70) fluctuates in response to the switching. As a result, the power of the OSC light which is transmitted over the optical transmission line 50 (or 70) also fluctuates in response to the switching. The pulse generation circuit 19 (or 39) and the VOA 13 (or 33) may function as an example of a transmitted light power adjusting section that varies the value of the optical power which is transmitted to the opposite station 30 (or 10). By using the pulse generation circuit 19 (or 39) and the VOA 13 (or 33), the transmitted light power adjusting section that varies the value of the optical power which is transmitted to the opposite station 30 (or 10) may be easily offered.

In the reception station 30 on the forward route (or the reception station 10 on the opposite route), the OSC light whose power fluctuates is received by the OSC receiver 37 (or 17). The OSC receiver 37 (or 17) may be an example of a received light measuring section and measures fluctuating multivalue, for example, binary OSC light reception power information with 0 dB and 10 dB (P22 of FIG. 5). Each measured value is converted into digital information and provided to the OSC transmitter 36 (or 16) on the opposite route (or the forward route).

The OSC transmitter 36 (or 16) generates an OSC light to which the provided binary digital information is added and outputs the generated OSC light to the optical multiplexer 32 (or 12) (P23 of FIG. 5). The optical multiplexer 32 (or 12) superimposes the OSC light on the main signal light amplified by the postamplifier 31 (or 11) and outputs the resultant light to the optical transmission line 70 (or 50) through the VOA 33 (or 13). For example, the OSC transmitter 36 (or 16) may function as an example of a notifying section that notifies the opposite station 10 (or 30) of the measurement result obtained in the OSC receiver 37 (or 17) which is an example of the received light measuring section.

The OSC light transmitted over the optical transmission line 70 (or 50) is separated from the main signal light in the optical branching filter 14 (or 34) of the opposite station 10 (or 30) and input to the OSC receiver 17 (or 37) on the opposite route (or the forward route) (P24 of FIG. 5).

In the OSC receiver 17 (or 37), although the OSC light reception power fluctuates (fluctuates by 10 dB every 1 second, for example), the OSC light reception power enters between the upper limit and the lower limit of the reception range of the OSC receiver 17 (or 37) during any time period. Therefore, the binary digital information that is transmitted from the opposite station 30 (or 10) in the form of the OSC light may be received or obtained by the OSC receiver 17 (or 37) without fail during any time period. The "reception range" may be an example of an operable range that is determined in accordance with the dynamic range of a light receiving element such as a PD provided in the OSC receiver 17, for example.

The OSC receiver 17 (or 37) provides the obtained binary digital information, for example, the OSC light reception power information in the opposite station 30 (or 10) to the range value selection circuit 20 (P25 of FIG. 5).

The range value selection circuit 20 selects one of the binary digital information based on the binary digital information provided thereto and the reception range information of the OSC receiver 17 (or 37), for example, the upper limit and the lower limit and provides the selected information to the VOA loss calculation circuit 21. The reception range information may be previously stored or set in a storing section such as a memory, for example. The reception range information may be notified by the OSC light that is transmitted from the OSC transmitter 36 (or 16) of the opposite station 30 (or 10) through the opposite route, for example.

For example, the range value selection circuit 20 may determine that there is a possibility that correct OSC light reception power may not be measured if a higher value of the binary digital information exceeds the upper limit of the reception range of the OSC receiver 17 (or 37) and may not use the higher value.

For instance, if a lower value of the binary digital information falls below the lower limit of the reception range of the OSC receiver 17 (or 37), the range value selection circuit 20 may determine that there is a possibility that correct OSC light reception power may not be measured and may not use the lower value.

Therefore, the range value selection circuit 20 selects (adopts), of the binary digital information, the information within the reception range of the OSC receiver 17 (or 37) as effective information and provides the information to the VOA loss calculation circuit 21 (P26 of FIG. 5). Of the binary digital information, the information which is out of the reception range of the OSC receiver 17 (or 37) may be recognized as invalid information and ignored.

The VOA loss calculation circuit 21 calculates the VOA loss (SG) based on the digital information provided thereto from the range value selection circuit 20 and the transmission power information (the set value) of the OSC light of the OSC transmitter 16 (or 36) (P27 of FIG. 5).

For example, if the digital information selected by the range value selection circuit 20 is a lower power value of the two power values, the VOA loss calculation circuit 21 calculates the SG by the following calculation expression (1).

$$SG = (\text{OSC light transmission power set value}) - \\ (\text{higher value of the two VOA loss values}) - \\ (\text{lower value of the two OSC light reception} \\ \text{power values}) \quad (1)$$

If the digital information selected by the range value selection circuit 20 is a higher power value of the two power values, the VOA loss calculation circuit 21 calculates the SG by the following calculation expression (2).

$$SG = (\text{OSC light transmission power set value}) - \\ (\text{lower value of the two VOA loss values}) - \\ (\text{higher value of the two OSC light reception} \\ \text{power values}) \quad (2)$$

The "two VOA loss values" in the calculation expression (1) or (2) may be obtained from the pulse generation circuit 19 (or 39), for example. The SG calculated by the calculation expression (1) or (2) is provided to the VOA loss determination circuit 22 (or 42).

The VOA loss determination circuit 22 (or 42) determines the VOA loss that satisfies SG+VOA loss=target value based on the SG provided thereto (P28 of FIG. 5). When the VOA loss is determined, the switch 23 (or 43) is switched to the contact b. The fluctuations of the VOA loss are stopped, and the VOA 13 (or 33) is controlled such that the determined VOA loss is obtained.

For example, the range value selection circuit 20, the VOA loss calculation circuit 21, the VOA loss determination circuit 22 (or 42), and the switch 23 (or 43) may function as an example of a control section. The control section determines the optical power that is transmitted to the opposite station 30 (or 10) based on the OSC light reception measurement result in the opposite station 30 (or 10) which is notified by the OSC transmitter 36 (or 16) of the opposite station 30 (or 10). The control section sets the VOA loss of the VOA 13 (or 33) such that the determined optical power is obtained. Therefore, the fluctuations of the optical power that is transmitted to the optical transmission line 50 (or 70) may be stopped.

The device (system) may be started in the manner described above. For example, the transmitted light power to the forward route and the opposite route at the time of start-up of the system may be set at an appropriate value in accordance with the SG and the reception range of the OSC receiver 37 (or 17).

In the transmission station 10 on the forward route illustrated in FIG. 4, reference numeral 25 may correspond to a circuit block including part or all of the pulse generation circuit 19, the range value selection circuit 20, the VOA loss calculation circuit 21, and the VOA loss determination circuit 22. The circuit block 25 may be an integrated circuit such as a field-programmable gate array (FPGA) or large scale integration (LSI) and may include such an integrated circuit. In the reception station 30 on the forward route illustrated in FIG. 4, a circuit block 45 including one or both of the pulse generation circuit 39 and the VOA loss determination circuit 42 may also be an integrated circuit such as FPGA or LSI and may also include such an integrated circuit.

Figure 6:
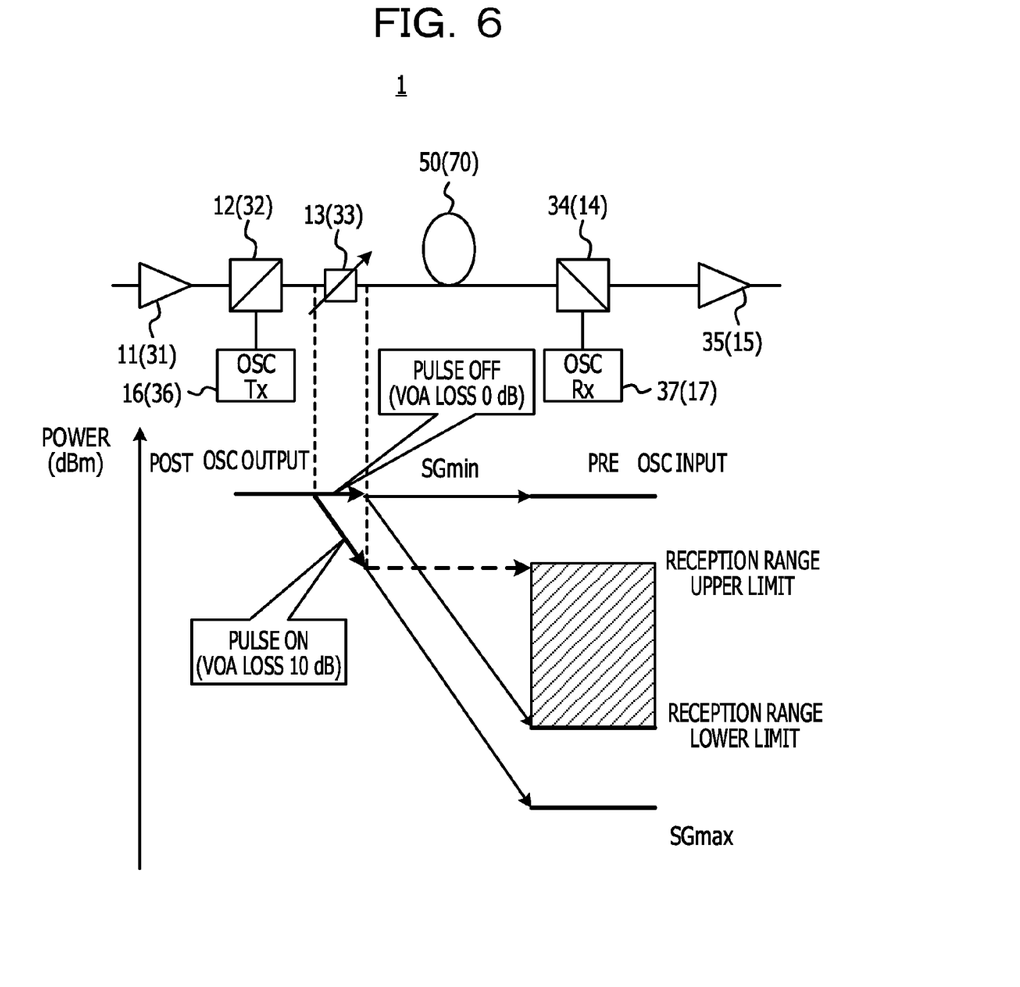
FIG. 6 illustrates an example of a level diagram of OSC light power.

FIG. 6 illustrates an example of a level diagram of OSC light power. In FIG. 6, the set value of the VOA loss which fluctuates is determined in the system configuration illustrated in FIG. 4. For example, the VOA loss may be set in such a way that, when the VOA loss is changed between two values, for example, 0 dB and 10 dB periodically, for example, every 1 second, the digital information added to the OSC light is received properly by the OSC receiver 17 (or 37) during any time period.

The transmission power of the OSC light that is superimposed on the main signal light amplified by the postamplifier 11 (or 31) may be 0 dBM, and the SG support range may be 0 to 30 dB. The upper limit of the reception range of the OSC receiver 17 (or 37) may be −10 dBm, and the lower limit of the reception range of the OSC receiver 17 (or 37) may be −30 dBm.

As illustrated in FIG. 6, of the two values: 0 dB and 10 dB of the VOA loss, as for a value with a lower loss, even when the SG is 30 dB which is a maximum value (SGmax), the OSC light reception power may be set so as to become more than or equal to the lower limit of the reception range. Therefore, as illustrated in FIG. 6, the VOA loss may be less than or equal to 0 dB, for example, 0 dB.

As for a value with a higher loss of the two values, even when the SG is 0 dB which is a minimum value, the OSC light reception power may be set so as to become less than or equal to the upper limit of the reception range. For example, in FIG. 6, the VOA loss may be 10 dB or more.

For example, if the VOA loss is set at 20 dB or more, as illustrated in FIG. 6, in a region in which the SG is less than 10 dB, a SG at which the two values do not fall within the reception range of the OSC receiver 17 (or 37) may occur. Therefore, the VOA loss with a higher loss of the two values may be set in a range of 10 dB or more but less than 20 dB.

The VOA loss may be changed at intervals of 1 second and may be changed at other time intervals. For example, the time intervals at which the VOA loss is changed simply may be longer than time intervals at which the reception power information is added based on the transmission bit rate of the OSC light and the amount of the binary reception power information that is added to the OSC light.

Figure 7:
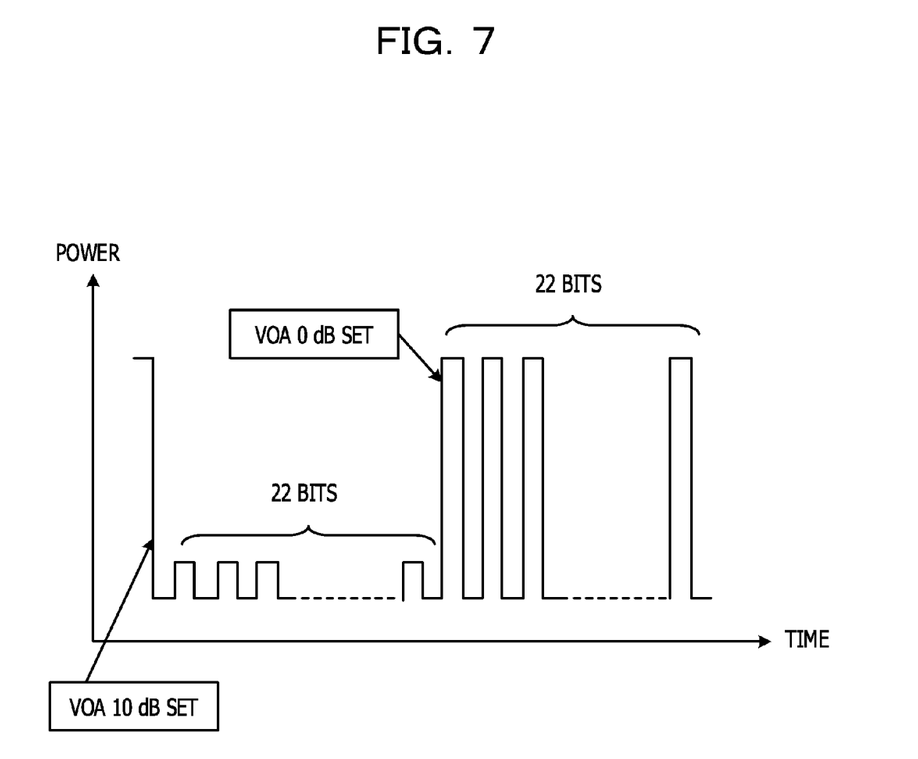
FIG. 7 illustrates an example of time intervals at which a VOA loss is changed.

For example, when three-digit information in the range of 99.9 dBm to −99.9 dBm is displayed in the digital information that is transferred by using the OSC light, the digital information simply may have 11 bits or more. Therefore, as illustrated in FIG. 7, to add the OSC light reception power information in each of a case where the VOA loss is 10 dB and a case where the VOA loss is 0 dB, the digital information simply may have 11 bits×2=22 bits or more. For example, when the transmission bit rate of the OSC transmitter 16 (or 36) is 100 Mbps, the time intervals at which the VOA loss is changed may be 22 bits/100 Mbps=0.22 μs or more. When the time intervals are increased to, for example, several minutes, since the start-up time may increase, the time intervals may be set at shorter time intervals.

The VOA loss to be changed may have two values and may have three or more values. In this case, each VOA loss value simply may be set in such a way that it is ensured that, at any value of a SG to be supported, the OSC light reception power falls within the reception range of the OSC receiver 17 (or 37) at any one or more VOA loss set values. For example, each VOA loss value may be set as described above. As a result of the number of VOA loss values being increased, the VOA loss may be changed in an analog fashion.

To vary the value of the power of the OSC light that is transmitted to the optical transmission line 50 (or 70), the VOA 13 (or 33) may be used and other devices that are capable of adjusting the optical attenuation may be used. For example, a wavelength selection switch (WSS) may be used.

The fluctuations of the value of the power of the OSC light that is transmitted to the optical transmission line 50 (or 70) may be periodical or may not be periodical. If the fluctuations are periodical, the fluctuation control may be simplified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system comprising:
   a first optical transmission device configured to perform bidirectional optical transmission with a second optical transmission device via an optical transmission line,
   wherein the first optical transmission device includes a transmitted light power adjusting section configured to transmit, to the second optical transmission device, a first light power which is set based on a measurement result, the second transmission device measuring a fluctuating light power transmitted from the first transmission device and informing the first transmission device of the measurement result,
   wherein the transmitted light power adjusting section includes:
   a variable optical attenuator configured to adjust an attenuation amount of a light power;
   a pulse generation circuit configured to generate a periodic pulse in which a first signal at a first level and a second signal at a second level different from the first level appear alternately and which varies the attenuation amount;
   a determination circuit configured to determine the attenuation amount; and
   a switch configured to supply one of an output of the pulse generation circuit and an output of the determination circuit to the variable optical attenuator.

2. The optical transmission system according to claim 1, wherein the switch supplies the output of the pulse generation circuit to the variable optical attenuator at a start-up of the first optical transmission device.

3. The optical transmission system according to claim 1, wherein an optical amplifier that amplifies a signal light is provided in a previous stage of the variable optical attenuator.

4. The optical transmission system according to claim 1, wherein the transmitted light power adjusting section varies the fluctuating light power to different two values.

5. The optical transmission system according to claim 4, wherein a first value of the different two values is set so as to be more than or equal to a lower limit of a light power range of the second optical transmission device at a maximum value of a transmission line loss on the optical transmission line, and a second value of the different two values is set so as to be less than or equal to an upper limit of the light power range at a minimum value of the transmission line loss.

6. The optical transmission system according to claim 5, wherein the first value is lower than the second value.

7. The optical transmission system according to claim 1, wherein the transmitted light power adjusting section regards the measurement result indicating that the fluctuating light power is out of a light power range of the second optical transmission device as an invalid result, and set the first light power on the measurement result indicating that the fluctuating light power is within the light power range.

8. The optical transmission system according to claim 1, wherein the transmitted light power adjusting section performs a variation periodically.

9. An optical transmission device comprising:
a transmitted light power adjusting section configured to vary optical power and transmit a fluctuating light power to another optical transmission device; and
a control section configured to set a first light power to be transmitted to the another optical transmission device based on a measurement result of the fluctuating light power which is measured in the another optical transmission device and control the transmitted light power adjusting section so as to output the first light power,
wherein the transmitted light power adjusting section includes:
a variable optical attenuator configured to adjust an attenuation amount of a light power;
a pulse generation circuit configured to generate a periodic pulse in which a first signal at a first level and a second signal at a second level different from the first level appear alternately and which varies the attenuation amount;
a determination circuit configured to determine the attenuation amount; and
a switch configured to supply one of an output of the pulse generation circuit and an output of the determination circuit to the variable optical attenuator.

10. The optical transmission device according to claim 9, wherein the switch supplies the output of the pulse generation circuit to the variable optical attenuator at a start-up of the first optical transmission device.

11. The optical transmission device according to claim 9, wherein an optical amplifier that amplifies a signal light is provided in a previous stage of the variable optical attenuator.

12. The optical transmission device according to claim 9, wherein the transmitted light power adjusting section varies the fluctuating light power to different two values.

13. The optical transmission device according to claim 12, wherein a first value of the different two values is set so as to be more than or equal to a lower limit of a light power range of the second optical transmission device at a maximum value of a transmission line loss on the optical transmission line, and a second value of the different two values is set so as to be less than or equal to an upper limit of the light power range at a minimum value of the transmission line loss.

14. The optical transmission device according to claim 13, wherein the first value is lower than the second value.

15. The optical transmission device according to claim 9, wherein the transmitted light power adjusting section regards the measurement result indicating that the fluctuating light power is out of a light power range of the second optical transmission device as an invalid result, and set the first light power on the measurement result indicating that the fluctuating light power is within the light power range.

16. The optical transmission device according to claim 9, wherein the transmitted light power adjusting section performs a variation periodically.

17. An optical transmission device comprising:
a received light measuring section configured to receive a fluctuating light power which is varied by another optical transmission device and measures the fluctuating light power; and
a notifying section configured to notify the another optical transmission device of a measurement result to set an optical power which is transmitted from the another optical transmission device,
wherein the another optical transmission device comprises a transmitted light power adjusting section including:
a variable optical attenuator configured to adjust an attenuation amount of a light power and output the fluctuating light power;
a pulse generation circuit configured to generate a periodic pulse in which a first signal at a first level and a second signal at a second level different from the first level appear alternately and which varies the attenuation amount;
a determination circuit configured to determine the attenuation amount; and
a switch configured to supply one of an output of the pulse generation circuit and an output of the determination circuit to the variable optical attenuator.

18. The optical transmission device according to claim 17, wherein the fluctuating light power is power of a monitoring control light.

19. The optical transmission device according to claim 17, wherein the notifying section notifies the another optical transmission device of a first measurement result indicating that the fluctuating light power is out of a light power range and a second measurement result indicating that the fluctuating light power is within the light power range.

20. The optical transmission device according to claim 17, wherein the fluctuating light power is varied periodically.

* * * * *